Sept. 17, 1974
J. C. DODD
3,836,681
DEVICE AND METHOD OF RECOVERING STICKY
PARTICULATE MATERIALS SUCH AS ALGAE
Filed March 1, 1972
4 Sheets-Sheet 3
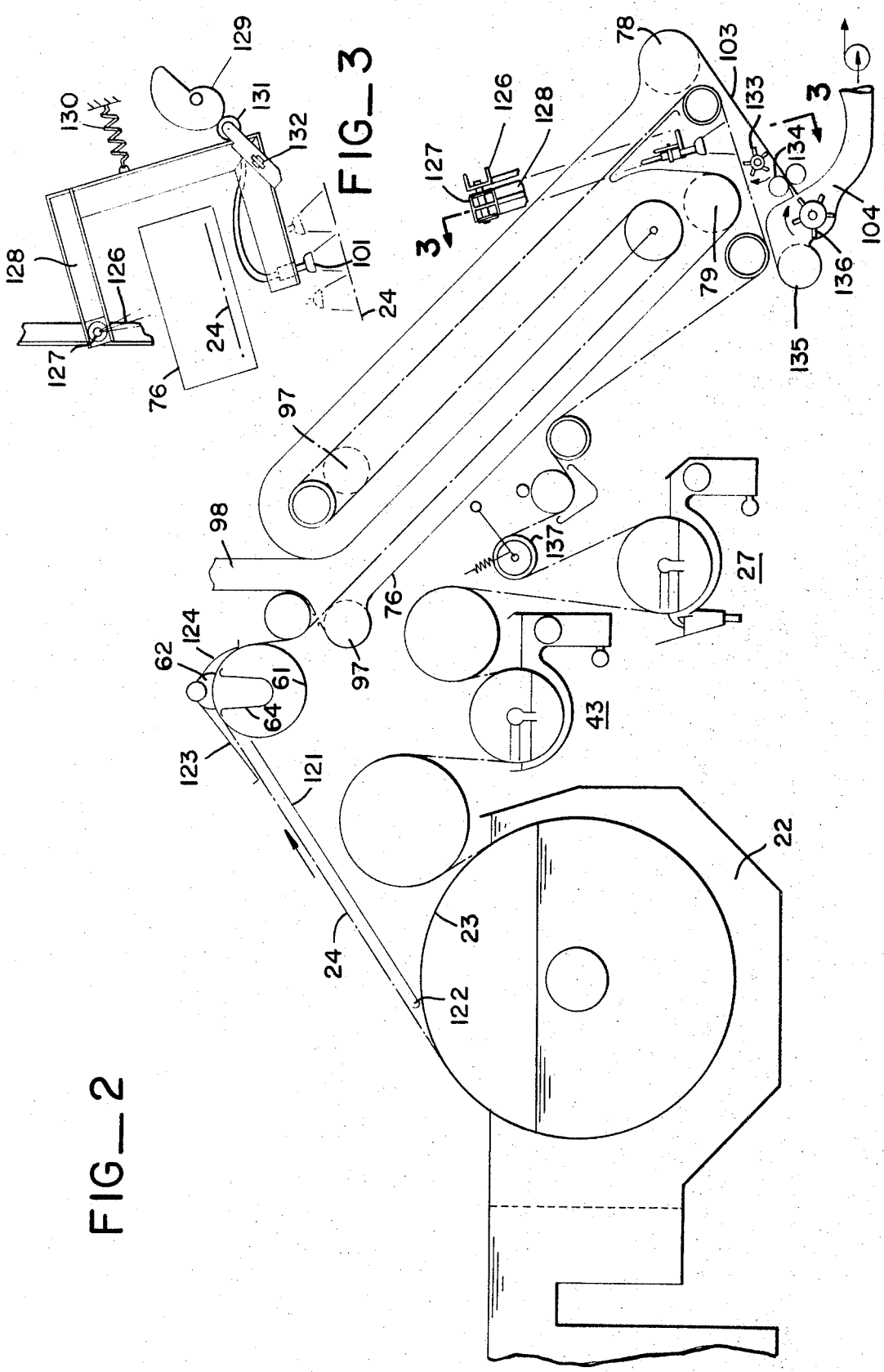

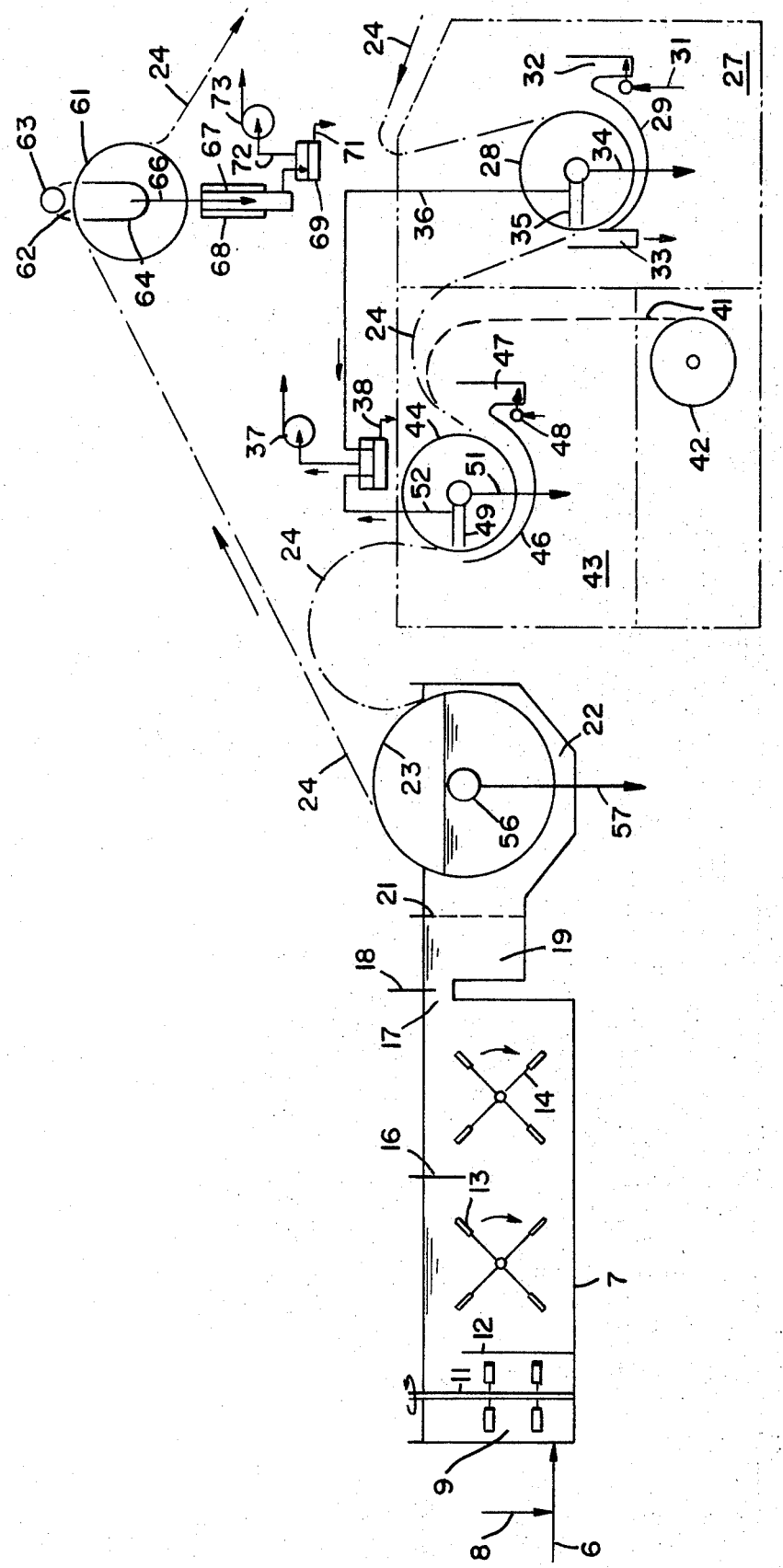

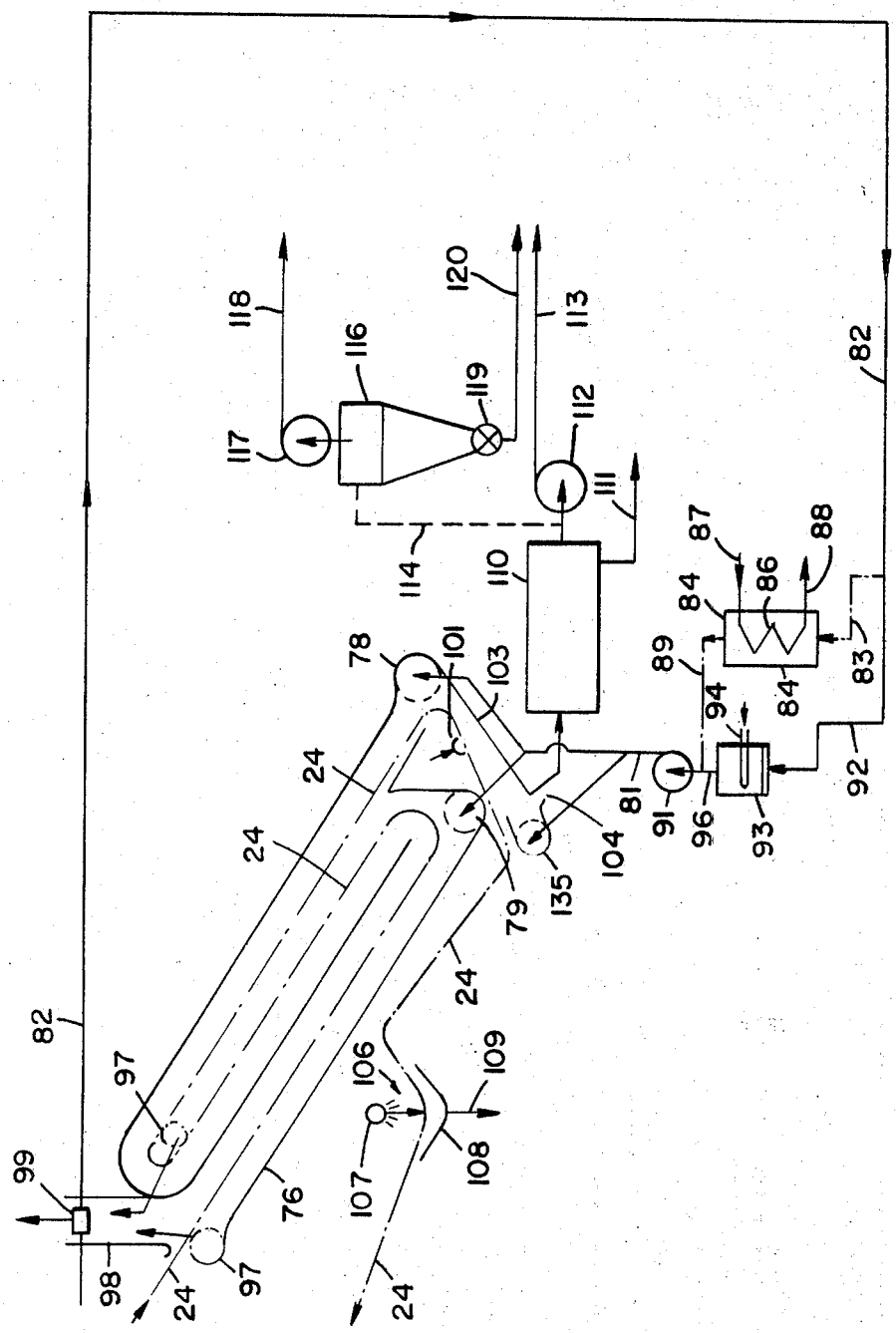
FIG_1B

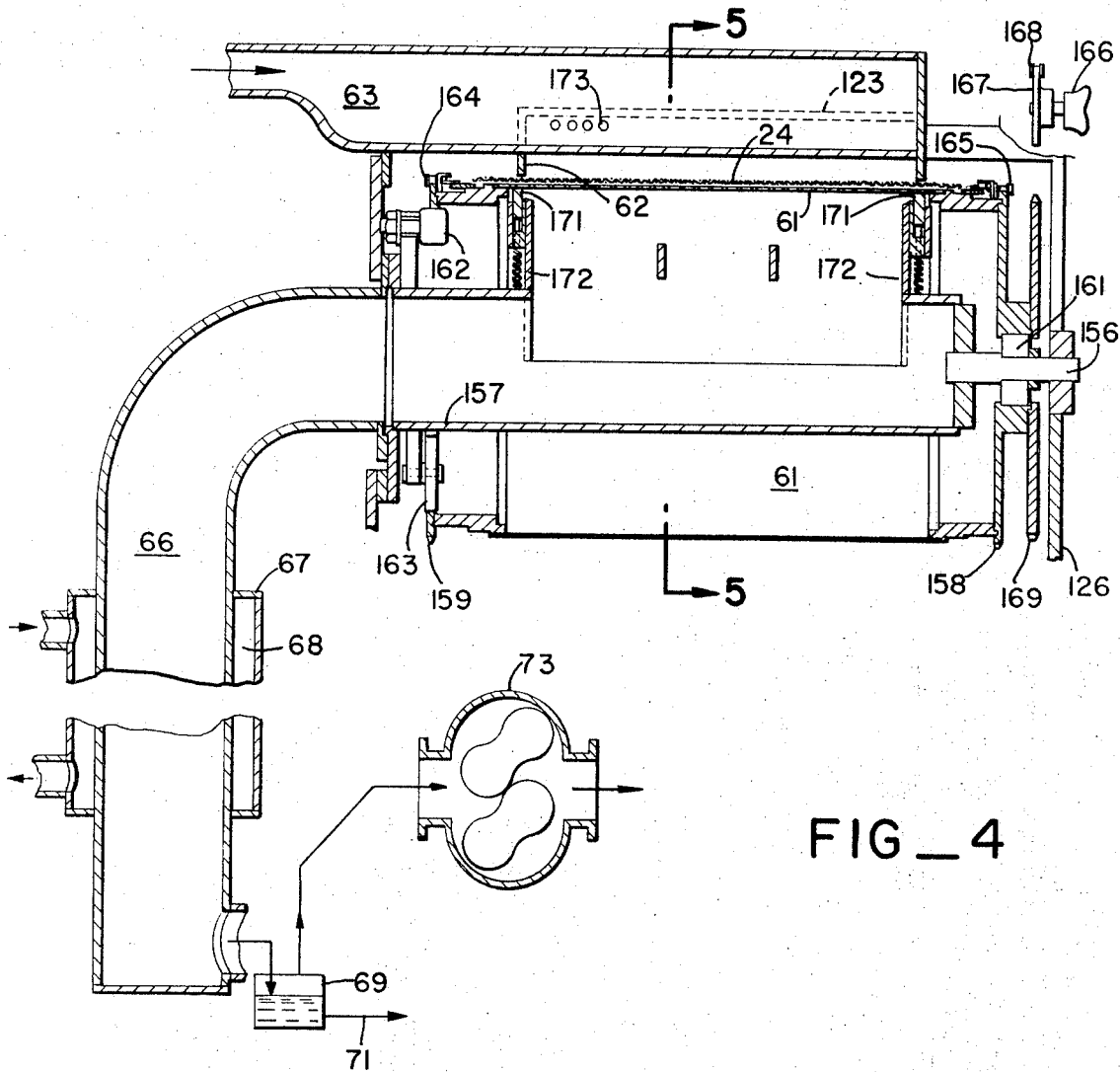
FIG_4
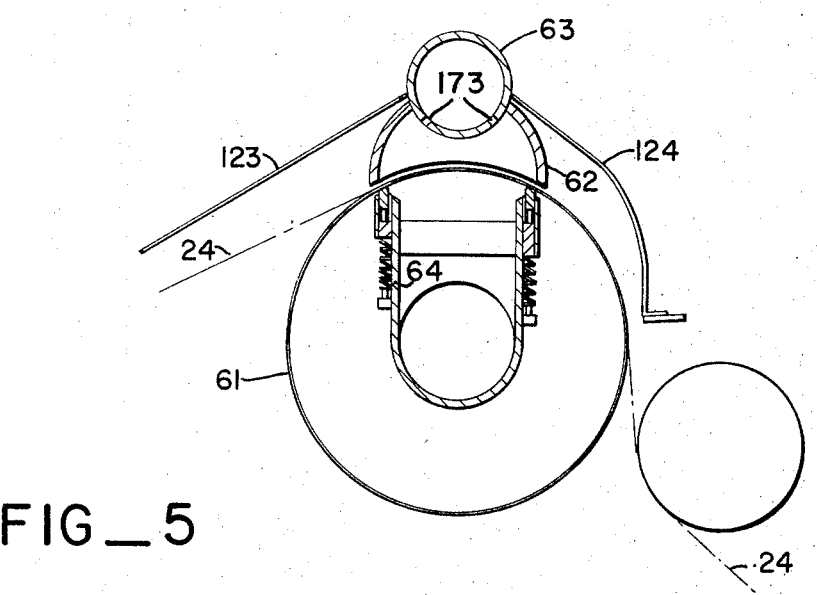
FIG_5

United States Patent Office 3,836,681
Patented Sept. 17, 1974

3,836,681
DEVICE AND METHOD OF RECOVERING STICKY PARTICULATE MATERIALS SUCH AS ALGAE
Joseph C. Dodd, 945 Craig Place,
Davis, Calif. 95616
Filed Mar. 1, 1972, Ser. No. 230,697
Int. Cl. B01d 33/04, 37/02
U.S. Cl. 426—272
9 Claims

ABSTRACT OF THE DISCLOSURE

Sticky particles (algae) are recovered from environmental liquid by being passed through a precoat on a screen, the particles being entrapped in the precoat. Dewatering and drying follow and the precoat with the entrapped particles is removed from the screen for subsequent use. The device for carrying out the method includes a screen moving in a set path. A coating unit supplies a precoat to the advancing screen. A depositing unit supplies particles in their environmental liquid to the precoat. Dewaterers and driers remove much of the liquid. The remaining, particle-precoat combination is removed from the screen preferably by a sonic whistle, and is discharged from the machine. A washer cleans the screen for reuse when necessary.

---

While the method of the invention has wide application and numerous uses in separating particles, particularly sticky particles, from a liquid in which they are suspended, an explanatory example is the recovery of algae from their environmental liquid.

Although the culture of algae has been known and pursued for some years, it has in recent times become of even greater interest not only from the standpoint of recovering the algae themselves but also from the standpoint of preventing the algae from acting as contaminants or pollutants in their environmental liquid or in a subsequent liquid.

The treatment of organic wastes in ponds or lagoons is commonly employed for domestic sewage, animal manure, cannery, meat packing and other industrial wastes, and more recently, has included stripping nutrients from secondary effluents and agricultural drainage water. The growth of algae in these environments is either the primary means of waste conversion or is supplemental to bacterial decomposition. In either case, organics are converted to algal cells which are transported out of the pond or lagoon with the effluent unless measures are taken to separate them from the waste stream. This discharge of algal cells in the effluent is one of the major objections to the use of ponds or lagoons for waste treatment, since subsequent decomposition of the cells in the receiving water can cause serious problems of oxygen depletion, nuisance odors and unsightliness, return of nutrients, etc. Consequently, economical separation of algae from dilute aqueous suspensions is a pressing need in the waste treatment field. Also, the recovery of the algae in a form suitable for livestock feed is advantageous as a means of defraying costs of waste treatment and to conserve valuable resources.

Various methods have been used to separate algae from wastewater, such as centrifugation, flocculation-sedimentation with alum (U.S. Pat. 2,867,945) or calcium chloride-sodium hydroxide (U.S. Pat. 3,431,200), flotation, filtration, conventional microscreening, etc. These processes provide initial concentration of the algae to varying degrees, but drying of the resulting slurry or paste must be accomplished by other means such as drum, spray, or sand bed drying. Centrifugation has been found too costly for wide commercial application. Flocculation-sedimentation and floation require the use of chemicals in relatively large concentrations, some of which may degrade the value of the product as a feedstuff. Alum is a commonly used coagulant, with dosage in excess of about 100 mg./l. Filtration and microscreening frequently allow a large fraction of the small planktonic algae to pass through, or are subject to rapid blinding of the filter medium. Ultrasonic cleaning of a screen on a belt type microstrainer in a water bath is disclosed in U.S. Pat. 3,489,679. Handling and drying of algae slurry or paste is difficult due to its tendency to stick to drying surfaces, or to degrade under extended exposure to heat or sunlight. Vacuum filters are used to dewater slurries, and commonly use precoat filter aids such as diatomaceous earth. The use of coagulant coatings on filter aids is disclosed in U.S. Pat. 3,352,424. Cleaning of vacuum filter belts by water or air-water jets is a common practice. Suction boxes for dewatering a paper web are used on the couch and press rolls of modern paper machines. The use of a steam hood over the suction box with internal condensation to enhance water extraction is disclosed by U.S. Pat. 2,714,839.

While various approaches to the removal or separation problem have been made as discussed above, the more economical methods are not particularly effective and the more effective methods are not particularly economical. In addition, the algal populations occurring in a treatment pond and the corresponding degree of difficulty in separating the algae from their growth environment are quite variable. Since the waste and environmental conditions in the pond are time-variant and the growth characteristics of algae are rapid, pond cultures normally exhibit large shifts in population over relatively short periods. Although it may be possible to exercise some control over algal population by adjustment of environmental conditions to favor those species having desirable removal and feed characteristics, the state of knowledge in this area is still very limited. Control measures may include the addition of deficient growth factors, correction of pH, light and temperature, and recirculation or inoculation of desirable species. In any event, the usual case will involve heterogeneous populations varying in time, in which the predominant species may be recovered with relative ease or only with great difficulty. The larger green algae would be representative of the former category, whereas some of the small colonial blue-green algae with extensive mucilaginous sheath are representative of the latter.

It is therefore an object of the invention to provide a way of separating particulate matter; for example, algae, from environmental liquid in an effective and economical manner and in large quantities.

Another object of the invention is to provide a way of separating particles, such as algae, from environmental liquid to provide an ultimate product that has an economic use, in the case of algae as a feedstuff primarily for ruminant livestock such as cattle.

Another object of the invention is to provide a method for separating fine particles of various different kinds, such as industrial wastes, from their containing liquid.

A further object of the invention is in general to provide an improved method for separating materials of various different sorts from their carrying liquid and providing a useful end product.

The invention incorporates a screen, such as a traveling belt of filter cloth, on which is deposited a thin layer of fibrous filter aid precoat, such as paper pulp, which may then be coated with a cationic polyelectrolyte. These form the filter medium for removing algae or other suspended matter from a dilute aqueous suspension as it flows through the belt on the submerged portion of a rotating screening drum. The suspended solids may be flocculated by the use of a coagulant such as a cationic polyelectrolyte prior to passing through the belt on the screening drum. The belt then leaves the screening drum and rises along a sloping path, losing part of the water content on the way by gravity drainage, to a vacuum dewatering drum, where a suction box or boxes further reduce the moisture content. Steam or heated air under low pressure may be used above the suction box or boxes to improve dewatering. The belt then passes into the initial drying section using high velocity heated air in a counter-current multi-loop arrangement, which reduces the moisture content sufficiently to prevent "ball-up" during mat blowoff and shredding. After the partially dry mat of precoat and algae is blown off using an air jet or intermittent air blast from the reverse side, the belt is washed by a water shower and returns to the starting point. The air jet for mat blowoff may use a scanning sonic or ultrasonic whistle, or an air nozzle. After blowoff, the mat may be shredded and conveyed pneumatically or removed as a sheet to the final drying section where the moisture content is reduced to or below equilibrium level. Complete drying would not normally be performed in the initial drying section. In the case of green algae, such as *Scenedesmus*, the mat may tend to curl and lift off the fabric prematurely due to differential shrinkage, causing transport difficulties on the belt. In the case of algae exhibiting strong sticking characteristics due to a mucilaginous sheath, as is the case with many blue-green algae, mat blowoff is somewhat improved if done before drying is complete. For materials that do not cause curling or worsened sticking of the mat, complete drying on the belt in the initial drying section may be desirable, in which case the final drying section would be eliminated. The fibrous precoat permits the use of a relatively coarse filter fabric, such as ASTM–60–250 nylon or "Nomex" nylon fabric, and reduces the tendency of the algae to stick to the fabric as would otherwise occur during drying. The fibrous precoat remains as an integral part of the algae product for roughage value in a feedstuff for ruminant or other livestock.

Although the above description applies to the separation and drying of algae for use as a feedstuff, the invention may also be used in other applications for the clarification of liquids and/or recovery of solids from dilute suspensions. The drying sections may be omitted where this is not necessary for the process. The invention is particularly applicable where the separated material is gummy, sticky or otherwise difficult to handle, such as found in the food processing, chemical and metal extraction or processing industries, and domestic and industrial waste treatment applications.

The practice of one example of the method and the structure of one embodiment of a machine are described in the accompanying description and disclosed in the accompanying drawings, in which:

FIG. 1A is a diagrammatic showing of the initial portion of a machine constructed pursuant to the invention and useful to carry out the method of the invention;

FIG. 1B is likewise a diagrammatic showing of the final portion of the indicated machine, the figures being readable as a unit when FIG. 1B is placed to the immediate right-hand of FIG. 1A, there being connecting lines joining such figures;

FIG. 2 is a diagrammatic view of a part only of a modified form of mechanism indicating a modified form of method, the remaining parts being as previously disclosed;

FIG. 3 is a cross-section, the plane of which is indicated by the line 3—3 of FIG. 2;

FIG. 4 is a transverse section on a vertical plane, partially diagrammatic, through a part of a dewatering unit of the machine of the preceding figures; and FIG. 5 is a cross-section, the plane of which is indicated by the line 5—5 of FIG. 4.

Customarily algae in their environmental or nutrient liquid or medium are available in an influent line 6 leading to a tank 7 of appropriate capacity. Under some conditions it is desired immediately to add a coagulant to the incoming liquid, because the algae can better be handled if they are made to cohere in clumps or flocs. If this is the case then the influent line 6 is preferably joined by a line 8 acting as an infeed for a suitable coagulant. Many coagulants are commercially available and are well known. A cogulant of the cationic polyelectrolytic type is preferred.

Incoming fluent material is received in one end of the tank 7 in a mixer compartment 9. A mechanically driven mixing device 11 assures that the incoming material is made largely homogeneous. Flow from the mixing chamber is over a baffle 12 into the main portion of the tank 7 in which are disposed additional stirring paddles 13 and 14 on either side of a surface baffle 16. The above arrangement is only one of many commonly employed means of flocculation; and other arrangements may be equally satisfactory.

The result is to enhance the flocculation of the incoming algae after the addition of the coagulant. Many species of algae and some other particulate materials do not require the addition of a coagulant and do not require flocculation for further handling. In that event material in the incoming line 6 can be delivered directly to a connector 17 controlled by a gate 18 and connected to an advance chamber 19 for the influent.

Material passes from the chamber 19 through a coarse screen 21 to make sure that only fine material such as algae or algae floc and the accompanying liquid are passed. The advancing material enters a chamber 22 in which a perforate screening drum 23 is disposed. This drum defines one portion of the closed circuit of a belt-like screen 24, represented by a dash and dot line. The screen may be a woven fabric having predetermined openings or interstices therein and is enlarged along its two parallel side edges to track well.

Pursuant to the invention, the screen when in the screening chamber 22 is preferably provided with a fibrous precoat disposed between the water and particulates, such as algae, in the chamber 22 and the screen itself. The right-hand end of FIG. 1A shows the screen 24 entering in clean condition. The screen then travels through either one of two alternative devices for supplying it with a fibrous precoat. For example, the clean screen 24 passes into a precoat forming section 27 and travels around a perforate forming drum 28 therein. The drum is suitably mounted with respect to a forming vat 29 which conveys the fiber suspension from a supply conduit 31 discharging into a distributor 32. The pulp involved may be of many different kinds, preferably having a reasonably free, fibrous nature such as that obtained from pulping waste paper. The vat 29 conveys a bath of pulp fiber to a certain level maintained by appropriate control. For example, a pulp overflow and discharge 33 returns excess pulp for reuse at supply conduit 31. The screen in traveling around the drum 28 picks up a superficial layer of the pulp fiber which adheres to the screen as the fiber suspension passes through the submerged portion of the screen. The liquid portion of the fiber suspension which passes through the screen is released through an overflow 34, with the water level inside the drum 28 controlled by a weir on the overflow.

To assist the screen to retain the pulp fiber and to make sure that a compact fibrous precoat is laid down on the screen, a vacuum connection 35 is in the interior of the perforate drum. A slight vacuum is supplied to the connection 35 through a duct 36 extending to a vacuum pump 37. A drain device 38 is interposed so that entrained water is removed and can be discharged before reaching the vacuum pump 37. The effect of the foregoing is to discharge from the section 27 a screen coated on one side with a thin fibrous precoat.

It is not always necessary to form the precoat from a fibrous suspension on the screen. Sometimes it is preferable to utilize a preformed sheet of fibrous material such as a thin grade of paper. For this alternative the section 27 and its various appurtenances are omitted. The screen 24 is coated directly with a preformed sheet 41 fed from a roll 42. The preformed paper sheet 41 is pressed against one side of the screen 24 as it merges with an appropriate drum such as the drum 44 or the drum 23.

For either the formed or preformed precoat a coagulant may be added at this stage, particularly if none is introduced through the inlet 8. If this is the case the screen 24 with the formed or preformed precoate enters a coagulant coating section 43, passing around the perforate drum 44 within a vat 46. Feeding into the vat 46 is a distributor 47 of coagulant furnished through an inlet line 48. In passing around the drum 44, the fiber precoat is coated with the coagulant. The adsorption of the algae to the precoat and breakthrough resistance are enhanced by the coagulant coating. After passing through the screen, the excess coagulant is released through an overflow 51 for reuse at the inlet line 48. To prevent sloughing of the precoat as it leaves the vat, excess liquid is removed through a chamber 49 having a connection 52 through the drain device 38 to the vacuum pump 37. The screen sheet 24 and its accompanying fiber precoat then are made to follow an appropriate path to engage with the drum 23. Where a preformed precoat 41 is used without coagulant coating, it is supplied directly from the roll 42 to the surface of the screen as it merges with the drum 23, and section 43 and its various appurtenances are omitted.

As the screen and precoat together pass around the drum 23 within the chamber 22, the surrounding particles such as algae and the accompanying liquid flow toward the interior of the drum since liquid is discharged therefrom through a duct 56 connected to a liquid drain 57. A weir on the discharge side controls the liquid level within the drum 23. The tendency is for the particles or algae to be held back or entrapped by the precoat on the screen and for the accompanying liquid to travel through the precoat and ultimately to be discharged through the drain 57. The screen 24 emerges from the compartment 22, as the drum 23 rotates, with a fibrous precoat having algae entrapped therein and some entrained liquid.

To remove at least some of the water which does not drain by gravity as the laden screen travels upslope from the drum 23, the screen and its wet layer of precoat and algae are trained around a perforate dewatering drum 61 having on the exterior a confined chamber 62 supplied through a duct 63 with hot air or dry steam. The hot air or steam are at a temperature low enough not to produce any deleterious effect upon the algae nor upon the fiber or screen.

On the interior of the drum 61, there is a vacuum chamber 64 connected to an outlet 66 extending through a heat exchanger 67. The elevated temperature of the material discharging through the duct 66 is suddenly reduced by cold water flowing through the heat exchanger jacket 68, causing the pressure to drop and water vapor to condense. The extracted and cooled fluid is brought into a separator 69 having a liquid release line 71 at the bottom and having an air and gas discharge line 72 extending through a vacuum pump 73 to release. As the laden screen passes around the drum 61, the algae and precoat layer is partially dewatered, with a consequent reduction in the quantity of water to be evaporated to obtain a stable, dry product.

One of the principal objectives of the present invention is to afford a relatively dry product for discharge from the machine. Although the drum 61 and its appurtenances are effective in removing a good deal of the moisture, additional treatment is usually preferred. For that reason the screen 24 continues (see FIG. 1B) from the drum 61 into a drying chamber 76. This is a thermally and acoustically insulated enclosure through which the screen 24 travels in a sinuous path around and along appropriate guides. At various locations the chamber 76 is provided with manifolds such as 78 and 79 all connected by pipes 81 to a hot air supply.

For such supply, air available in a duct 82 is given either one of two treatments. From the duct 82 air may travel through a line 83 into a heating chamber 84 within which is provided a steam coil 86 having a supply line 87 and a return line 88. The temperature within the chamber 84 is elevated to the desired value so the air flowing in through the duct 83 is discharged through a duct 89 in warmed condition. The warm air goes into a blower 91 leading into the ducting 81 connected to the manifolds 78 and 79 for the chamber 76.

An alternative path for the incoming air from the duct 82 is through a line 92 into a furnace 93. A burner 94 within the furnace heats the air and discharges it through a pipe 96 into the blower 91 for transmisssion to the interior of the chamber 76.

The hot air within the chamber 76 warms the material on the screeen 24 and picks up moisture released therefrom. The cooler, moist air is discharged from the chamber 76 through manifolds 97 and an outlet 98. If desired, a heat exchanger 99 may be disposed in the exhaust outlet 98 and joined to the fresh air inlet duct 82 to recover some of the heat from the exhaust air.

The materials within the chamber 76 are subsstantially heated and much water is driven therefrom. Near the right lower portion of the chamber 76, as seen in FIG. 1B, in the region of the manifold 78 the screen 24 carries a mat of fibrous material and algae closely adhered to the screen and sufficiently dry to prevent sticking or ball-up after removal from the screen.

Various means may be utilized for the removal of the mixed fiber and particle or algal mat from the screen. This may not be easy, particularly with the initially mucilaginous algal forms. Various devices operate with different particles, such as algae and algal mixtures, with various degrees of success. I have had particularly satisfactory results with most materials using a stem-jet whistle 101 with parabolic reflector as a removing device. The steam-jet whistle is a device from which gas (such as air) issues in a jet at a predetermined frequency or within a predetermined frequency range. This is sometimes referred to as ultrasonic in the event the peak energy frequency is above about 15 kilohertz and is referred to as sonic in the event the peak energy frequency is less than about 15 kilohertz. Sometimes an interrupted whistle operation affording instants of silence followed by a sharp blast of the whistle jet is quite effective and reduces air consumption. A similar effect results when the whistle is scanned back and forth across the screen width, coordinated with belt travel speed to fully cover the screen. The result of the whistle blast or of the air vibrations is to dislodge the layer from the screen belt with a considerable degree of cleanliness. By far the largest portion of the screen coating or layer is removed from the screen at this station.

The material detached by the operation of the whistle 101 falls into a trough 103 and is discharged from the housing 76 for future use through an opening 104. The largely unloaded screen 24 also leavees the housing 76 and travels through a washer 106. This includes a shower 107 discharging wash water over the belt and into an appropriate trough 108. Waste is discharged through a duct 109 and can be recycled to the mixing tank 9 if it contains any substantial amount of fiber or algae. The clean screen 24 leaving the washer is then led directly to the precoat forming section 27, shown at the right end of FIG. 1A, for repetition of the cycle.

The product discharged through the opening 104 (FIG. 1B) is put through a final dryer 110 of any suitable form, preferably as small particles, and is released through a discharge channel 111. The gases and vapor driven off in the dryer 110 are removed by a blower 112, exhausting through a pipe 113 connected therewith.

Should the nature of the product tend to release solid particles with the exhausted air, it is feasible to provide an alternate arrangement. In this case, the discharge from the dryer 110 is not to the blower 112. Rather the discharge is into a line 114 leading to a cyclone separator 116 to which a blower 117 is connected. From the blower 117 a discharge duct 118 leads away. The solid product retained in the cyclone separator 116 can be discharged through an appropriate rotary valve 119 and into a release duct 120. From either discharge 111 or 120, or both, the product is suitable for use.

It has been found that both constituents of the product, algae and also the fibrous precoat utilized on the screen, form valuable fractions of a livestock ration, particularly for cattle and other ruminant animals. The presence of the fibrous precoat material does not interfere with many of the possible uses but in the usual instance is a valuable adjunct to the algae content. The cost of the fiber material is low enough to leave the process quite economical and affords a continually renewed filter medium capable of adjustment for influent conditions. It particularly permits stripping the algae from the conveying screen in a reasonable dry form without the problems of handling a sticky gelatinous material characteristic of other algal recovery methods.

The process and mechanism with some modifications are illustrated in somewhat more mechanical detail, although still diagrammatically, in FIG. 2. Some refinements are included. For example, as the screen 24 passes out of the chamber 22 away from the drum 23, gravity drainage from the screen is caught by a sheet 121 having a drain 122 so that the drainage can be carried away or recycled. The drum 61, although retaining the heating chamber 62 and the vacuum chamber 64, has extensions 123 and 124 to augment the heated area.

The drying chamber 76 has a special, scanning whistle mounting, as shown in FIGS. 2 and 3. Connected to the frame 126 of the machine by a pivot 127 is a support arm 128 driven by a rotary cam 129 engaging a cam follower 131 on the support arm. Auxiliary guide rolls 132 ensure a planar, swinging movement of the arm as the cam rotates. The arm carries the whistle 101 which is supplied with actuating gas through a flexible line. The path of travel of the whistle as the arm is swung by the rotating cam is transversely across substantially the entire width of the screen. A spring 130 affords a rapid return. The subjacent portions of the screen and its lading are subjected sequentially to the action of the whistle. The mat of algae and fiber is thus stripped or forced from the screen.

Since the solid and shreddable mat may come from the screen in relatively large sheets, under such circumstances I prefer to provide the lower portion of the housing 76 with a rotating breaking reel 133 with flexible paddles to assist in pulling the mat from the screen and conveying it down the trough. Also, a family of slitter knives 134 and a rotary shredder 136 may be provided so that only small, comminuted pieces of the discharged material enter into the discharge duct 104. Heated air entering the duct above the shredder 136 through a pipe 135 conveys the shredded product into the duct 104 to the final drying and recovery sections.

The rest of the construction in FIG. 2 is about like that in FIGS. 1A and 1B, although there are some additional mechanical features shown, such as guiding drums or tracks, belt take-up mechanisms 137 and the like. The general operation of the FIG. 2 structure is substantially as described in connection with both parts of FIG. 1.

As an indication of some of the mechanical construction of the machinery involved, previously illustrated diagrammatically, there is provided an example, particularly shown in FIGS. 4 and 5.

Mounted on the frame 126 is a stationary shaft 156 extended axially by an enlarged tube 157. At its far end the tube 157 is secured to a stationary portion of the mechanism. Adapted to rotate around the shaft 156 and the tube 157 is a pair of sprocket wheels 158 and 159 which in turn support the perforate dewatering drum 61. The sprocket wheel 158 is carried on a bearing 161 on the stationary shaft 156 and the sprocket wheel 159 is carried on spaced rollers such as 162 and 163 rotatably mounted on the stationary frame. The sprocket wheels 158 and 159 engage marginal chains 164 and 165 making parallel, closed circuits and carrying the screen 24 between them in a positive fashion. The screen side edges are somewhat enlarged to support the screen from spaced attachments to the chain.

To drive the rotary mechanism there is provided a motor reducer 166 having a drive sprocket 167 secured thereto and engaging a chain 168 trained around a drive sprocket wheel 169 fastened to the sprocket 158. The screen 24 is advanced as desired. Open to the enlarged central or axial tube 157 is the vacuum chamber 64 which is also open to the interior of the perforate drum 61 and the screen 24. Sliding seals 171 are disposed at all the margins of the chamber. The seals are pressed into place by coil springs 172 so there is little or no leakage between the stationary chamber 64 and the interior of the perforate drum 61. The chamber 64 leads to an outlet tube 66, as previously described, around which the heat exchanger jacket 68 is disposed. Thereafter, the tube 66 leads to the separator 69 and to the vacuum pump 73, as previously noted.

Engaging with the upper portion of the screen in this area are the walls of the chamber 62 which communicate through apertures 173 with the steam or hot air duct 63, as previously described. The heating area is augmented or extended by wings 123 and 124 as also seen in FIG. 2.

As an operating example for a small pilot machine, it may be considered that the influent to the apparatus is a dilute aqueous suspension of algae, having a suspended solids concentration of about 100–200 mg./l., such as effluent from a maturation pond for treatment of sewage. The algal population has a heterogeneous species distribution, predominantly of moderate sized planktonic green algae, such as *Scenedesmus,* but also has sufficient blue-green algae to cause some sticking tendency. Flocculation is accomplished with a cationic polyelectrolyte such as "Purifloc C31," dosage being from 2 to 6 mg./l. The influent flow rate is from 60,000 to 120,000 gallons per day. The screening drum diameter is 42 inches. The belt effective width is 14 inches. The belt travel speed is 8 to 15 feet per minute. The filter fabric is ASTM 60–250, Nylon 6—6 (60 x 60 plain weave, 250 micron mesh opening, 160 micron thread diameter, 37 percent open area). The filter aid precoat is pulped paper such as paper hand towelling. Precoat weight is 25–35 g./m.$^2$ of oven dry material. The filter aid coating is cationic polyelectrolyte such as "Purifloc C31" and the applied dosage is from 0.000 to 0.004 grams per gram of filter aid precoat. The difference in water level across the screening drum is from 4 to 8 inches. The suspended solids in the effluent from the apparatus amount to 20–40 mg./l. The weight of algae in the dry product is from 25 to 40 percent. The production rate of dry algae-paper product is 150 to 500 pounds per day. The inlet temperature of the drying air is from 200 to 250 degrees F. The mat blowoff sonic whistle is similar to the "Astrosonics Model 461" with parabolic reflector operated at an inlet pressure of from 25 to 45 p.s.i. The product moisture content at blowoff is from 30 to 50 percent (wet basis). The moisture content after final drying is from 5 to 10 percent (wet basis).

It is understood that the above described example is merely illustrative of the principles of this invention. Those skilled in the art may readily devise other variations that will embody the principles of the invention. It is therefore to be understood that within the scope of the appended claims, the invention may be practiced otherwise than as specifically described.

What is claimed is:

1. The method of recovering, as a livestock feed, sticky particles such as algae from an environmental liquid containing said particles, comprising the steps of:
   continuously moving a foraminous carrier along a closed path;
   applying a continuous precoat layer of fibrous material, suitable as a fraction of livestock feed, to one side of said carrier as it moves along said path;
   directing said precoated carrier through a body of said liquid and sticky particles;
   inducing flow of said liquid through said precoat layer and carrier from said precoated side to cause entrapment of sticky particles in said precoat layer;
   directing said carrier, precoat layer and entrapped particles from said body of liquid, while draining excess liquid therefrom, and through a drying zone;
   removing moisture from said layer and entrapped particles, while in said zone, until it is sufficiently dry to be a substantially solid and shreddable layer; and thereafter removing said shreddable layer from said carrier.

2. The method defined in claim 1 wherein said carrier is directed from said body of liquid along an upwardly sloping path to facilitate said draining of excess liquid therefrom.

3. The method defined in claim 1 including the step of adding a coagulant to said precoat layer prior to directing said carrier through said body of liquid.

4. The method defined in claim 1 including the further step of comminuting said shreddable layer after dislodgement thereof from said carrier.

5. The method defined in claim 1 wherein said step of applying said precoat layer is performed by feeding a web of dry paper to said one side of said carrier as it moves along said path.

6. The method defined in claim 1 wherein said step of removing said shreddable layer from said carrier is performed by directing a jet of air through said carrier, from the other side thereof, with sufficient force to dislodge said shreddable layer therefrom.

7. The method defined in claim 6 including the step of modulating said jet of air to pulsate at a sonic frequency.

8. The method defined in claim 6 including the further step of reciprocating said jet of air across said carrier, in a direction transverse to the direction of movement of said carrier, whereby said jet is directed through substantially all portions of said carrier.

9. The method defined in claim 1 including the step of adding a coagulant to said environmental liquid prior to directing said precoated carrier therethrough.

References Cited
UNITED STATES PATENTS

| | | | |
|---|---|---|---|
| 2,403,021 | 7/1946 | Peterson et al. | 210—75 |
| 3,352,424 | 11/1967 | Guebert et al. | 210—75 X |
| 2,714,839 | 8/1955 | Mazer | 162—297 |
| 1,892,681 | 1/1933 | Rankin | 210—152 X |
| 3,431,200 | 3/1969 | Davis et al. | 210—53 X |
| 2,318,368 | 5/1943 | Broughton | 210—391 X |
| 2,829,773 | 4/1958 | Saddington | 210—75 |
| 3,707,230 | 12/1972 | Davidson | 210—77 |
| 2,963,160 | 12/1960 | Wennberg | 210—400 X |
| 3,118,748 | 1/1964 | Delfs | 55—292 |

SAMIH N. ZAHARNA, Primary Examiner

I. CINTINS, Assistant Examiner

U.S. Cl. X.R.

210—68, 75, 77, 67; 426—378, 443, 807, 210